United States Patent [19]

Kamba et al.

[11] Patent Number: 5,447,982
[45] Date of Patent: Sep. 5, 1995

[54] PROCESS FOR PREPARING AN AQUEOUS DISPERSION, AQUEOUS DISPERSION AND AQUEOUS COATING COMPOSITION

[75] Inventors: Motoi Kamba; Toru Ishida; Hiroshi Washita; Hisao Kawazoe; Yoshihiro Ohtsuka, all of Yokohama, Japan

[73] Assignee: Asahi Glass Company Ltd., Tokyo, Japan

[21] Appl. No.: 355,815

[22] Filed: Dec. 14, 1994

Related U.S. Application Data

[63] Continuation of Ser. No. 97,918, Jul. 28, 1993, abandoned, which is a continuation of Ser. No. 624,524, Dec. 10, 1990, abandoned, which is a continuation of Ser. No. 347,658, May 5, 1989, abandoned.

[30] Foreign Application Priority Data

| May 13, 1988 | [JP] | Japan | 63-114864 |
| Sep. 27, 1988 | [JP] | Japan | 63-23953 |
| Nov. 29, 1988 | [JP] | Japan | 63-299659 |

[51] Int. Cl.$^6$ .................................................. C08F 2/16
[52] U.S. Cl. ........................................................ 524/458
[58] Field of Search ............................................ 524/458

[56] References Cited

FOREIGN PATENT DOCUMENTS

| 0251751 | 1/1988 | European Pat. Off. |
| 0320156 | 6/1989 | European Pat. Off. |
| 1261367 | 11/1967 | Japan ................... 524/805 |

*Primary Examiner*—Peter D. Mulcahy
*Attorney, Agent, or Firm*—Oblon, Spivak, McClelland, Maier, & Neustadt

[57] ABSTRACT

A process for preparing an aqueous dispersion, which comprises subjecting a monomer to emulsion polymerization in an aqueous medium in the presence of a fluorine-containing copolymer comprising units derived from a fluoroolefin, and units having a hydrophilic side chain.

30 Claims, No Drawings

PROCESS FOR PREPARING AN AQUEOUS DISPERSION, AQUEOUS DISPERSION AND AQUEOUS COATING COMPOSITION

This application is a Continuation of application Ser. No. 8/097,918, filed on Jul. 28, 1993, now abandoned which is a continuation of 07/624,524 filed on Dec. 10, 1990, now abandoned which is a continuation of 07/347,658 filed on May 5, 1989 now abandoned.

The present invention relates to a process for producing an aqueous dispersion of a fluorine-containing copolymer, a novel aqueous dispersion and a novel aqueous coating composition.

Heretofore, it has been known that copolymers made of a fluoroolefin, a cyclohexyl vinyl ether and various other monomers, are soluble in organic solvents at room temperature, and when used as coating materials, they provide transparent coating layers having high gloss and excellent properties of fluorinated resins, such as high water resistance, water and oil repellency, stain resistance and non-adhesiveness (e.g. Japanese Unexamined Patent Publication No. 44083/1980). Their use is increasing in the field of e.g. building construction.

On the other hand, in recent years, there have been restrictions against use of organic solvents from the viewpoint of air pollution. Under these circumstances, the demand is increasing for aqueous coating materials or powder coating materials which employ no organic solvents. Such studies have been made also with respect to fluorine resins, and it has been reported that fluorine resins having no functional group can be prepared by emulsion polymerization (Japanese Unexamined Patent Publication No. 25411/1980).

Heretofore, it has been common to conduct emulsion polymerization in the presence of an emulsifier, as a method for preparing an aqueous dispersion. However, the aqueous dispersion obtainable by such method contains a large amount of the emulsifier, which is a water-soluble substance. Therefore, when formed into a film, the water resistance of the film is poor. There has been an additional problem that since the emulsifier is apt to decompose, the film is poor in the weather resistance.

Recently, an emulsion polymerization method has been proposed wherein a graft copolymer having a fluorine-containing side chain and a hydrophilic side chain is used as a dispersion stabilizer (Japanese Unexamined Patent Publication No. 10611/1988). However, the aqueous dispersion obtainable by this method was inadequate in the improvement of the weather resistance, although it is capable of providing a film having good water resistance.

Further, a method is known wherein a vinyl monomer is polymerized in an organic liquid in the presence of a fluorine-containing copolymer soluble in the organic liquid, and then water is added and the organic liquid is distilled off (Japanese Unexamined Patent Publication No. 243603/1987). However, this method has a problem that the process steps are cumbersome and involve a danger since the organic liquid is used in a large amount, although it is thereby possible to obtain an aqueous dispersion capable of forming a film excellent in the weather resistance.

It is an object of the present invention to solve the above-mentioned problems inherent to the conventional techniques and to provide a method for readily and safely preparing an aqueous dispersion capable of providing a film excellent in the water resistance and weather resistance, and an aqueous coating composition excellent in the water resistance and weather resistance.

The present invention provides a process for preparing an aqueous dispersion, which comprises subjecting a monomer to emulsion polymerization in an aqueous medium in the presence of a fluorine-containing copolymer comprising units derived from a fluoroolefin, and units having a hydrophilic-side chain.

The present invention also provides an aqueous coating composition consisting essentially of the aqueous dispersion obtained by the above process.

Further, the present invention provides an aqueous dispersion comprising a fluorine-containing copolymer dispersed in water, wherein the fluorine-containing copolymer is a fluoropolymer comprising, as essential components, polymer units derived from a fluoroolefin and polymer units derived from a macromonomer having a hydrophilic site.

Furthermore, the present invention provides an aqueous coating composition consisting essentially of such aqueous dispersion, Now, the present invention will be described in detail with reference to the preferred embodiments.

In the process of the present invention, it is important to conduct the emulsion polymerization in the presence of a fluorine-containing copolymer comprising units derived from a fluoroolefin and units having a hydrophilic side chain. As such fluorine-containing copolymer, it is preferred to employ a copolymer containing fluorine atoms bonded to the main chain in a proportion of at least 10% by weight, since a film having excellent weather resistance will thereby be obtained.

As the fluoroolefin, it is preferred to employ a fluoroolefin having from 2 to 4 carbon atoms such as vinylidene fluoride, trifluoroethylene, chlorotrifluoroethylene, tetrafluoroethylene, pentafluoropropylene or hexafluoropropylene.

In the fluorine-containing copolymer, units derived from a fluoroolefin preferably constitute from 20 to 80 mol %, more preferably from 30 to 70 mol %. If the content of units derived from a fluoroolefin is too small, no adequate weather resistance will be obtained. On the other hand, if it is too large, the solubility to water will be extremely low, and emulsion polymerization will be practically difficult, such being undesirable.

In the present invention, the fluorine-containing copolymer also contains units having a hydrophilic side chain. The hydrophilic side chain may be a hydrophilic side chain such as a polyoxyethylene chain or a side chain having a hydrophilic group such as a carboxylic acid group or a carboxylate group. From the efficiency for the production, it is preferred to employ as the hydrophilic group a side chain having a hydrophilic group. Further, the hydrophilic group is preferably located at the terminal of the side chain from the viewpoint of its effectiveness. Such hydrophilic group includes a carboxylic acid group or a carboxylate group of the formula —COOM, a sulfonic acid group or a sulfonate group of the formula —SO$_3$M and a phosphonic acid group or a phosphonate group of the formula —PO$_3$M (wherein M is hydrogen, an alkali metal, a quaternary ammonium group, or a quaternary phosphonium group), and an amido group. With respect to the hydrophilic side chain, it is preferred that repeating units having a hydrophilic side chain are contained in an amount of from 0.1 to 80 mol% in the fluorine-containing copolymer. If the amount of the hydrophilic side chain is too small, the copolymer will be hardly dispersible or soluble in water, whereby emulsion polymerization will be practically difficult. On the other hand, if the amount of the hydrophilic side chain is too large, the copolymer tends to cause gelation, such being undesirable. Particularly preferred is a fluorine-containing copolymer containing from 1 to 20 mol % of repeating units having the hydrophilic side chain.

For the introduction of the hydrophilic side chain to the fluorine-containing copolymer, the following methods may be mentioned. In a first method, a monomer having a hydrophilic chain or a hydrophilic group is copolymerized. In a second method, a compound capable of providing a hydrophilic chain or a hydrophilic group is reacted to a fluorine-containing copolymer having a reactive group, by a polymer reaction, to introduce the hydrophilic side chain. In a third method, a fluorine-containing copolymer having preliminarily polymerized thereto, a monomer capable of forming a hydrophilic group by e.g. hydrolysis, is hydrolyzed, to form the hydrophilic side chain. For the first method, the monomer having a hydrophilic chain or a hydrophilic group is preferably a compound having an ethylenically unsaturated group from the viewpoint of the copolymerizability with the fluoroolefin. As the compound having an ethylenically unsaturated group, a vinyl compound, an allyl compound, an acryloyl compound or a methacryloyl compound may be mentioned. The hydrophilic chain may be a polyethylene oxide or the like, and the hydrophilic group may be a carboxylic acid group, a carboxylate group, a sulfonic acid group, a sulfonate group, a phosphonic acid group, a phosphonate group or an amino group, as mentioned above. The monomer having the hydrophilic chain or a hydrophilic group may be the one wherein hydrogen atoms bonded to carbon atoms are partially or entirely substituted by fluorine atoms. Specific examples of the monomer having such hydrophilic chain or hydrophilic group, includes:

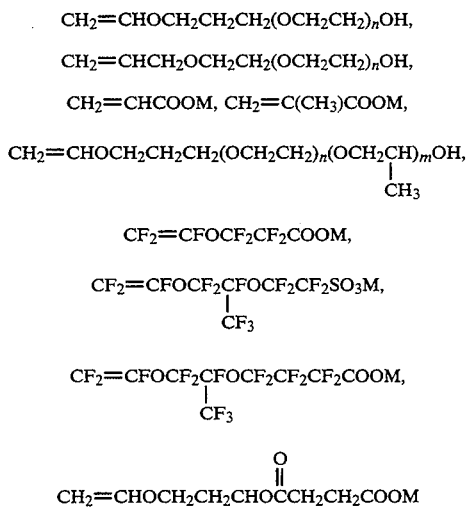

In the above formula, M is hydrogen, an alkali metal, a quaternary ammonium group or a quaternary phosphonium group, as mentioned above.

In the second method by a polymer reaction, the fluorine-containing copolymer having a reactive group may be as follows. The reactive group includes an active hydrogen-containing group such as a hydroxyl group, a carboxylic acid group, an amino group, an acid amino group or a mercapto group, an epoxy group, an active hydrogen-containing group and a double bond. Such reactive group may be introduced to the fluorine-containing copolymer by copolymerizing the monomer having the reactive group with a fluoroolefin. Here, the monomer having the reactive group may be a reaction product of a lactone compound or dicarboxylic anhydride with a hydroxyalkyl vinyl ether, a hydroxyalkyl allyl ether, a hydroxyalkyl vinyl ether or a hydroxyalkyl allyl ether, a reaction product of phenol with glycidyl vinyl ether or glycidyl allyl ether, a reaction product of an isocyanate alkyl methacrylate with glycidyl vinyl ether, glycidyl allyl ether, an amino alkyl vinyl ether, acrylic acid amide or a hydroxyalkyl vinyl ether, or ally vinyl ether.

In the second method, a compound capable of providing a hydrophilic chain or a hydrophilic group is reacted to the above-mentioned fluorine-containing copolymer having a reactive group, by a polymer reaction. The compound capable of providing a hydrophilic chain may be a compound having a hydrophilic chain such as a polyoxyethylene having an isocyanate terminal group and a group reactive with the above-mentioned reactive group of the fluorine-containing copolymer, or a compound capable of forming a hydrophilic chain such as ethylene oxide by introducing a polyoxyethylene chain by the addition reaction of ethylene oxide to the hydroxyl group in a fluorine-containing copolymer. The compound capable of providing a hydrophilic group may be a compound having a hydrophilic group and a group reactive with the reactive group of the fluorine-containing copolymer, such as a polybasic carboxylic acid such as succinic acid, a polybasic sulfonic acid, a polybasic phosphonic acid, acrylic acid amide, methacrylic acid amide, methacrylic acid or acrylic acid. Further, it is also possible to employ a compound capable of forming a hydrophilic group by the reaction with the reactive group of the fluorine-containing copolymer, such as a polybasic carboxylic acid anhydride. When the hydrophilic group is an acid group, it is preferably neutralized with an ionic compound, since the hydrophilic nature can thereby be obtained effectively. Here, the neutralization with an ionic compound may be conducted either prior to or after the reaction with the fluorine-containing copolymer. In connection with the relation with the curable reactive sites described hereinafter, the compound capable of providing a hydrophilic chain or a hydrophilic group may be reacted to all of the reactive groups in the fluorine-containing copolymer. Otherwise, a part of the reactive groups of the fluorine-containing copolymer may be left unreacted. The presence or absence of the unreacted reactive groups in the fluorine-containing copolymer, may be controlled by properly selecting the type and the amount of the compound capable of providing a hydrophilic chain or a hydrophilic group to be reacted.

According to the third method, a compound capable of forming a hydrophilic group by e.g. hydrolysis, is preliminarily copolymerized at the time of preparing the fluorine-containing copolymer, and it is hydrolyzed after the polymerization to form a hydrophilic group. Here, the compound capable of forming a hydrophilic group by e.g. hydrolysis, to be preliminarily copolymerized, may be, for example, an unsaturated carboxylic acid ester such as acrylic acid ester, or an unsaturated sulfonic acid ester.

The fluorine-containing copolymer may contain in addition to the above-mentioned units derived from a fluoroolefin and repeating units having a hydrophilic side chain, units derived from a monomer copolymerizable therewith. As such monomer, an olefin, a vinyl ether, a vinyl ester, an allyl ether, an allyl ester, an acrylic acid ester or a methacrylic acid ester, may be mentioned. If such monomer is copolymerized excessively, the weather resistance tends to be low, such being undesirable. When such monomer is copolymerized, the proportion is preferably not more than 70 mol %. Further, when such monomer is copolymerized, there will be advantage such that the dispersibility of pigments and the gloss of the film will be excellent and the compatibility with a monomer during emulsion polymerization as described hereinafter, will be good. As such monomer, an olefin, a vinyl ether, a vinyl ester, an allyl ether or an allyl ester, can particularly preferably be employed. Here, the olefin is preferably the one having from 2 to 10 carbon atoms. The vinyl ether, the vinyl ester, the allyl ether and the allyl ester are preferably those having a linear, branched or alicyclic alkyl group having from 2 to 15 carbon atoms.

The fluorine-containing copolymer is preferably the one having curable reactive sites, since it is thereby possible to obtain a tough coating layer. Such curable reactive sites are sites capable of reacting with a curing agent or curable reactive sites themselves to provide a cured product. Specifically, they may be the same groups as described above as the reactive groups of the fluorine-containing copolymer. For example, they may be active hydrogen-containing groups such as hydroxyl groups, carboxylic acid groups, amino groups, acid amido groups or mercapto groups, epoxy groups, active halogen-containing groups and double bonds. For the introduction of such curable reactive sites to the fluorine-containing copolymer, the same method as described above for the introduction of the reactive groups in the second method as a method for introducing the hydrophilic side chain to the fluorine-containing copolymer, i.e. a method of copolymerizing a monomer having a curable reactive site, may be mentioned. With respect to the curable reactive sites, repeating units containing the curable reactive sites are preferably from 0 to 35 mol % in the fluorine-containing copolymer.

In the present invention, there is no particular restriction as to the molecular weight of the fluorine-containing copolymer. However, if the molecular weight is too high, the viscosity of the aqueous medium will be too high, and it becomes difficult to obtain a satisfactory micelle in the aqueous medium, such being undesirable. It is also undesirable that the molecular weight is too low, since the water resistance will be poor. Usually, it is preferred that the number average molecular weight is at a level of from 1,000 to 500,000, particularly from 3,000 to 400,000.

According to the process of the present invention, emulsion polymerization is conducted in the presence of the above-mentione fluorine-containing copolymer. As the medium, water may be used alone, or a mixture of water and an organic liquid may be used. When an organic liquid is mixed, a stable dispersion may sometimes be obtainable. The aqueous dispersion obtained by the process of the present invention, may be used by itself as an aqueous coating material. Here, the organic liquid may be an alcohol such as methyl alcohol, ethyl alcohol, isopropyl alcohol, n-butyl alcohol, isobutyl alcohol, tert-butyl alcohol, sec-butyl alcohol, amyl alcohol, pentanol or octyl alcohol, an ether alcohol such as methyl cellosolve, ethyl cellosolve, isopropyl cellosolve, butyl cellosolve or diethylene glycol monobutyl ether, or a fluorine-type solvent such as trichlorofluoroethane. Such organic liquids may be used alone or in combination as a mixture of two or more.

In the present invention, there is no particular restriction as to the monomer for the emulsion polymerization, so long as it is emulsion-polymerizable by a usual method. The emulsion-polymerizable monomer is preferably a monomer having an $\alpha,\beta$-ethylenically unsaturated group, and it may be a vinyl compound including an olefin such as ethylene or propylene, a vinyl ether such as ethyl vinyl ether, propyl vinyl ether, butyl vinyl ether or cyclohexyl vinyl ether, a vinyl ester such as butyl vinyl ester or octyl vinyl ester, and an aromatic vinyl compound such as styrene or vinyl toluene, an allyl compound including an allyl ether such as ethyl allyl ether, an allyl ester such as butyl allyl ester, an acryloyl compound such as butyl acrylate, a methacryloyl compound such as ethyl methacrylate, or these compounds in which hydrogen atoms bonded to carbon atoms are partially or entirely substituted by halogen atoms. The compounds substituted by halogen atoms may be a halogenated olefin such as vinyl chloride, vinyl bromide, vinylidene chloride, vinylidene fluoride, chlorotrifluoroethylene, tetrafluoroethylene or hexafluoropropylene, a halogenated vinyl compound such as perfluoro(propyl vinyl ether), fluoroacrylate and fluoromethacrylate. Further, it is also possible to employ a monomer having a reactive group such as a hydroxyalkyl vinyl ether or a glycidyl allyl ether. Such monomer may be homo-polymerized alone, or two or more of such monomers may be copolymerized. Among them, it is particularly preferred that a fluoroolefin having from 2 to 4 carbon atoms such as hexafluoropropylene, pentafluoropropylene, tetrafluoroethylene, chlorotrifluoroethylene, trifluoroethylene or vinylidenefluoride, and a vinyl compound, an allyl compound, a fluorinated vinyl compound or a fluorinated allyl compound, are emulsion-polymerized as monomers, since it is thereby possible to obtain an aqueous dispersion capable of providing a coating layer having excellent weather resistance.

In the present invention, the above-mentioned fluorine-containing copolymer can be used in an amount within a range of from 0.1 to 99 parts by weight, based on 100 parts by weight of the monomer for emulsion polymerization. If the amount of the fluorine-containing copolymer is less than 0.1 part by weight per 100 parts by weight of the monomer for emulsion polymerization, the stability of the resulting aqueous dispersion tends to be low, such being undesirable. Further, when the polymer obtained by the emulsion polymerization does not show good weather resistance, e.g. when the polymer contains no fluorine or a very small amount of fluorine, it is preferred to use at least 10 parts by weight of the fluorine-containing copolymer per 100 parts by weight of the monomer for emulsion polymerization, in order to obtain an aqueous dispersion capable of providing a coating layer having adequate weather resistance.

In the process of the present invention, a pH controlling agent may be used for the purpose of increasing the pH of the emulsion. Such pH controlling agent includes inorganic salts such as sodium carbonate, potassium carbonate, sodium hydrogen phosphate, sodium thiosulfate, sodium tetraborate, and organic salts such as triethylamine and triethanolamine. The pH controlling agent may be added in an amount of from 0.05 to 5 parts by weight, preferably from 0.1 to 1 part by weight, per 100 parts by weight of the medium for emulsion polymerization.

In the process of the present invention, the initiation of the emulsion polymerization is conducted by an addition of a polymerization initiator like the initiation of usual emulsion polymerization. As such polymerization initiator, a water-soluble initiator is preferably employed. Specifically, there may be mentioned an inorganic initiator, for example, a persulfate such as ammonium persulfate, hydrogen peroxide, or a redox initiator composed of a combination of such persulfate or hydrogen peroxide with a reducing agent such as sodium hydrogen sulfite or sodium thiosulfate, or such inorganic initiator combined with a small amount of iron, a ferrous salt or silver sulfate; or an organic initiator, for example, a dibasic acid peroxide such as disuccinic acid peroxide or diglutaric acid peroxide, an azobisisobutylamidine dihydrochloride or azobisbutyronitrile. The amount of the polymerization initiator may be varied suitablly depending upon the type or the emulsion polymerization conditions. Usually, however, the initiator is used in an amount of from 0.005 to 5 parts by weight, preferably from 0.05 to 0.5 parts by weight, per 100 parts by weight of the monomer for emulsion polymerization.

The temperature for the initiation of the emulsion polymerization is selected at the optimum level depending primarily upon the type of the polymerization initiator. Usually, however, it is within a range of from 0° to 100° C., preferably from 10° to 90° C. The reaction pressure may suitably be selected, and is usually from 1 to 100 kg/cm$^2$, preferably from 2 to 50 kg/cm$^2$.

Further, in the process of the present invention, the addition of the monomer may be conducted in such a manner that an additional amount is added after the polymerization reaction has proceeded to a certain extent. In the case where such an additional amount is added, the monomer to be added may have the same composition as the monomer composition initially charged or may have a different composition.

The present invention also provides an aqueous coating composition consisting essentially of the aqueous dispersion obtained by the above-mentioned process. Such aqueous coating composition provides a coating layer excellent in the water resistance and weather resistance.

Further, such aqueous coating composition may be the aqueous dispersion obtained by the above process itself. However, if required, a coloring agent, a plasticizer, a photostabilizer an ultraviolet absorber, a levelling agent, a defoamer, a deaerater, a wetting agent, a film forming assisting agent, an anti-skinning agent or a curing agent may be incorporated. As the coloring agent, a dye, an organic pigment or an inorganic pigment may be mentioned. The plasticizer may be of a conventional type, for example, a low molecular weight plasticizer such as dimethyl phthalate or dioctyl phthalate or a high molecular weight plasticizer such as a vinyl polymer plasticizer or a polyester plasticizer. The ultraviolet absorber may be an organic ultraviolet absorber such as a phenone type, a benzotriazole type or a phenyl salicylate type, or an inorganic ultraviolet absorber such as titanium oxide. The curing agent may be, for example, a block isocyanate such as a trimer of hexamethylene isocyanate, a melamine resin such as methylated melamine, methylol-modified melamine or butylol-modified melamine, an amino resin such as benzoguanamine, or a urea resin such as methylated urea or butylated urea.

in the aqueous coating composition, the respective components are preferably mixed in the form of aqueous dispersion. As compared with the case where solid or liquid components are incorporated to an aqueous dispersion, the incorporated components can be microscopically dispersed by mixing aqueous dispersions to one another, whereby the respective components are uniformly distributed in the resulting coating layer. For example, when two or more polymers are incorporated, it is possible to obtain a highly transparent coating layer, since uniform dispersion can readily be effected. Further, when an aqueous dispersion of a polymer having high glass transition temperature (hereinafter sometimes referred to simply as Tg) and an aqueous dispersion of a polymer having a low Tg, are mixed, it is possible to obtain a coating layer having high hardness, good processability, high flexibility and improved antiabrasion properties. Further, it is possible to improve the stain resistance, antistatic properties and hardness of the coating layer by incorporating an aqueous dispersion of a polymer containing no fluorine and an aqueous dispersion of an organic substance (such as electrically conductive carbon).

An aqueous dispersion comprising a fluorine-containing copolymer dispersed in water, wherein fluorine-containing copolymer is a fluoropolymer comprising, as essential components, polymer units derived from a fluoroolefin and polymer Units derived from a macromonomer having a hydrophilic site, is useful as the fluorine-containing copolymer in the above-mentioned process for the preparation of an aqueous dispersion, and is also useful by itself as a base for an aqueous coating composition.

Here, the fluoroolefin is preferably a fluoroolefin having from 2 to 4 carbon atoms such as vinylidene fluoride, trifluoroethylene, chlorotrifluoroethylene, tetrafluoroethylene, pentafluoropropylene or hexafluoropropane. Particularly preferred is a per haloolefin.

Further, it is important that the fluoropolymer has polymer units derived from a macromonomer having a hydrophilic site. Such units are contained as an essential component of the fluoropolymer, whereby the mechanical and chemical stability of the aqueous dispersion is improved, and further, the film-forming properties and the water resistance of the coating layer can also be improved. Even with a fluoropolymer having functional groups such as hydroxyl groups, excellent stability of the aqueous dispersion can be accomplished.

The hydrophilic site in the macromonomer having the hydrophilic site in the present invention represents a site having a hydrophilic group, a site having a hydrophilic bond and a combination of such sites. The hydrophilic group may be ionic, non-ionic or amphoteric, or a combination thereof. However, it is not desirable that the above-mentioned hydrophilic site is composed exclusively of a site having an ionic hydrophilic group, since there will be a problem in the chemical stability of the aqueous dispersion. In such a case, it is desirable to combine it with a site having a non-ionic or amphoteric hydrophilic group, or to combine it with a site having a hydrophilic bond. The macromonomer is meant for a low molecular weight polymer or oligomer having a radical polymerizable unsaturated group at one terminal.

Namely, it is a compound having a radical polymerizable unsaturated group at one terminal and at least two repeating units. It is usually preferred to employ a compound having at least 100 repeating units in view of the polymerizability, water resistance, etc., although it may depend on the type of the repeating units.

The macromonomer having a hydrophilic site includes, for example, polyethers having radical polymerizable unsaturated groups at their one terminal, for example, as follows:

(1) $CH_2=CHO(CH_2)_l[O(CH_2)_m]_nOX$, wherein l is an integer of from 1 to 10, m is an integer of from 1 to 4, n is an integer of from 2 to 20, and X is a hydrogen or a lower alkyl group;

(2) $CH_2=CHCH_2O(CH_2)_l[O(CH_2)_m]_nOX$, wherein l, m, n and X are as defined above;

(3) 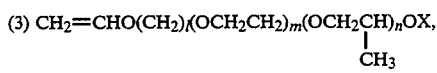

wherein l is an integer of from 1 to 10, m is an integer of from 2 to 20, n is an integer of from 0 to 20, and X is hydrogen or a lower alkyl group, and the oxyethylene units and the oxypropylene units may be arranged in either a block form or a random form.

(4) 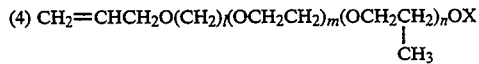

wherein l, m, n and X are as defined above with respect to the formula (3), and the oxyethylene units and the oxypropylene units optionally may be arranged in either a block form or a random form; and among them, the one having a structure of a vinyl ether type at one terminal is preferred, since it is excellent in the copolymerizability with the fluoroolefin. Those wherein the polyether chain portion is composed of oxyethylene units or a combination of oxyethylene units and oxypropylene units, are particularly preferred, since they are excellent, for example, in the hydrophilic properties. Further, at least two oxyethylene units should be present to accomplish various properties including the stability. If the number of oxyalkylene units is too large, the water resistance or weather resistance of the coating layer tends to be poor, such being undesirable. The macromonomer having a hydrophilic site can be prepared by a method which comprises polymerizing formaldehyde or a diol to a vinyl ether or allyl ether having a hydroxyl group, or by the ring-opening polymerization of an alkyleneoxide or a compound having a lactone ring.

Further, the macromonomer having a hydrophilic site may be a macromonomer having chains formed by the radical polymerization of a hydrophilic ethylenically unsaturated monomer and having a radical polymerizable unsaturated group such as a vinyl ether or allyl ether at its terminal. Such macromonomer can be prepared by the method disclosed by Yamashita et al in Polym. Bull., 5, 335 (1981). Namely, an ethylenically unsaturated monomer having a hydrophilic group is radical-polymerized in the presence of a chain transfer agent and an initiator having a functional group capable of condensation, to produce a polymer having a functional group capable of condensation, and then a compound such as glycidyl vinyl ether or glycidyl allyl ether is reacted to the functional group of this polymer to introduce a radical polymerizable unsaturated group to the terminal.

The ethylenically unsaturated monomer used for the preparation of this macromonomer, includes acrylamide, methacrylamide, N-methylol acrylamide, N-methylolmethacrylamide, 2-methoxyethyl acrylate, 2-methoxyethyl methacrylate, diacetone acrylamide, hydroxyethyl acrylate, hydroxypropyl acrylate, hydroxybutyl acrylate, hydroxyethyl methacrylate, hydroxypropyl methacrylate, hydroxybutyl methacrylate, an acrylic acid ester of a polyhydric alcohol, a methacrylic acid ester of a polyhydric alcohol, and vinyl pyrrolidone. In addition, as a copolymerizable monomer, acrylamide and its derivatives, methacrylamide and its derivatives, N-methylol acrylamide derivatives, ethyl acrylate carbitol, methyl acrylate triglycol, 2-hydroxyethylacryloyl phosphate, and butoxyethyl acrylate, may be mentioned.

The initiator useful for the preparation of this macromonomer, includes 4,4'-azobis-4-cyanovalerianic acid, 2,2'-azobis-2-amidinopropane hydrochloride, potassium peroxide, ammonium peroxide, azobisisobutylonitrile and benzoyl peroxide.

The fluoropolymer in the present invention may contain in addition to the above-mentioned two types of units, polymer units containing a hydroxyl group. The aqueous dispersion of the present invention has stability which is not impaired even when the fluoropolymer has hydroxyl groups. Further, when the fluoropolymer has hydroxyl groups, there is a merit that when the fluoropolymer is used as the base for a coating composition, it is possible to obtain a coating layer having excellent water resistance and solvent resistance by the combination with a curing agent.

The polymer units containing a hydroxyl group, may be formed by copolymerizing a hydroxyl group-containing monomer or by a polymer reaction of a polymer. Here, the hydroxyl group-containing monomer may be a hydroxyalkyl vinyl ether such as hydroxybutyl vinyl ether, a hydroxyalkyl allyl ether such as hydroxyethyl allyl ether, a hydroxyalkyl ester of acrylic acid or methacrylic acid, such as hydroxyethyl acrylate or hydroxyethyl methacrylate, a hydroxyalkyl vinyl ester or a hydroxyalkyl allyl ester. Further, as the method of forming units containing a hydroxyl group by the polymer reaction of a polymer, a method may be mentioned wherein a vinyl ester hydrolyzable after the polymerization, is copolymerized, followed by hydrolysis to form hydroxyl groups.

The fluoropolymer in the present invention, may contain, in addition to the above described units, units derived from a monomer copolymerizable therewith.

Such monomer may be a vinyl compound including an olefin such as ethylene or propylene, a vinyl ether such as ethyl vinyl ether, propyl vinyl ether, butyl vinyl ether or cyclohexyl vinyl ether, a vinyl ester such as butyl vinyl ester or octyl vinyl ester, and an aromatic vinyl compound such as styrene or vinyl toluene, an allyl compound including an allyl ether such as ethyl allyl ether or butyl allyl ester, an acryloyl compound such as butyl acrylate, or a methacryloyl compound such as ethyl methacrylate. Particularly preferred are an olefin, a vinyl ether, a vinyl ester, an allyl ether and an allyl ester. Here, the olefin is preferably the one having from 2 to 10 carbon atoms, and the vinyl ether, vinyl ester, allyl ether and allyl ester are preferably those having a linear, branched or alicyclic alkyl group having from 2 to 15 carbon atoms. In such monomer, hydrogen atoms bonded to carbon atoms may be at least partially substituted by fluorine atoms.

The fluoropolymer in the present invention preferably comprises from 20 to 80 mol % of polymer units derived from a fluoroolefin and from 0.1 to 25 mol % of polymer units derived from a macromonomer having a hydrophilic site. If the amount of the polymer units derived from a fluoroolefin is too small, no adequate weather resistance can be obtained. On the other hand, if the amount is too large, the dispersibility in water becomes poor, such being undesirable. The units derived from a fluoroolefin are preferably from 30 to 70 mol %. On the other hand, if the amount of the polymer units derived from a macromonomer having a hydrophilic site is too small, the dispersibility in water will be poor, and if the amount is too large, the weather resistance and water resistance of the coating layer will be poor, such being undesirable. The content of the polymer units derived from the macromonomer is preferably from 0.3 to 20 mol %. Further, in a case where polymer units containing hydroxyl groups are contained, the content is preferably not higher than 25 mol %. If the content of such units is too large, the dispersibility in water will be poor, and it is likely that the coating layer after curing will be hard and brittle, or the water resistance will be low due to an influence of the remaining hydroxyl groups, such being undesirable. Further, such units will be counted for both of the polymer units derived from a macromonomer containing a hydrophilic site and the polymer units containing a hydroxyl group, when the polymer units derived from the macromonomer having a hydrophilic site contain those having hydroxyl groups. The content of units other than the polymer units derived from the above fluoroolefin and the polymer units derived from the macromonomer having a hydrophilic site, is preferably from 0 to 70 mol %. If such units are too much, the weather resistance tends to be poor, such being undesirable.

The aqueous dispersion of the present invention is a dispersion of the above described fluoropolymer in water. The aqueous dispersion of the present invention exhibits excellent mechanical and chemical stability even when an emulsifier or hydrophilic organic solvent commonly used in a conventional dispersion of a fluorine-containing polymer, is not present. Of course, one or both of the emulsifier and the hydrophilic organic solvent may be incorporated. However, an emulsifier tends to deteriorate the water resistance of the coating layer, and the hydrophilic organic solvent is restricted in its use as a solvent. Therefore, it is preferred not to incorporate them. Here, when an emulsifier is to be used, an anionic, cationic, non-ionic, amphoteric, non-ionic/cationic and non-ionic/anionic emulsifiers or those having a reactive group may be used alone or in combination.

The aqueous dispersion of the present invention may be prepared by subjecting a fluoroolefin, a macromonomer having a hydrophilic site and, if necessary, other monomer, to emulsion polymerization in an aqueous medium. The initiation of the emulsion polymerization may be conducted by an addition of a polymerization initiator as in the case of the initiation of usual emulsion polymerization. Such polymerization initiator may be a usual radical initiator. However, a water-soluble initiator is preferably employed. Specifically, there may be mentioned an inorganic initiator, for example, persulfate such as ammonium persulfate, hydrogen persulfate or a redox initiator composed of a combination of such a persulfate or hydrogen peroxide with a reducing agent such as sodium hydrogen sulfite or sodium thiosulfate, or such inorganic initiator combined with a small amount of iron, a ferrous salt or silver sulfate, or an organic initiator, for example a dibasic acid peroxide such as disuccinic acid peroxide or diglutaric acid peroxide, azobisisobutylamidine dihydrochloride, or azobisisobutyronitrile. The amount of the polymerization initiator may be selected suitably depending upon type and the emulsion polymerization conditions. However, it is usually within a range of from 0.005 to 0.5 part by weight, per 100 parts by weight of the monomer for emulsion polymerization. Further, such polymerization initiator may be added all at once, but may be added portionwise, as the case requires.

For the purpose of increasing the pH of the emulsion, a pH controlling agent may be employed. Such pH controlling agent includes inorganic bases such as sodium carbonate, potassium carbonate, sodium hydrogen phosphate, sodium thiosulfate and sodium tetraborate, and organic bases such as triethyl amine and triethanol amine. The pH controlling agent is added usually in an amount of from 0.05 to 5 parts by weight, preferably from 0.1 to 1 part by weight, per 100 parts by weight of the medium for the emulsion polymerization.

The temperature for the initiation of emulsion polymerization is selected at the optimum level depending primarily on the type of the polymerization initiator. It is usually within a range of from 0° to 100° C., preferably from 10° to 90° C. The reaction pressure may be suitably selected and is usually preferably from 1 to 100 kg/cm$^2$, particularly from 2 to 50 kg/cm$^2$.

In such process, the materials such as the monomers, the solvent and the initiator, may be charged all at once for polymerization. However, for the purpose of improving various physical properties such as the stability of the dispersion and the gloss of the coating layer by minimizing the particle size of the dispersed particles, the starting materials may be emulsified prior to the addition of the polymerization initiator by means of an agitation machine such as a homogenizer, and then the initiator is added for polymerization. Further, the monomers may be added portionwise or continuously. In such a case, the monomer composition may be varied.

The aqueous dispersion of the present invention may be used as the fluorine-containing copolymer for the above-mentioned process for preparing an aqueous dispersion according to the present invention, or may be used by itself as an aqueous coating composition. If necessary, a coloring agent, a plasticizer, a hot stabilizer, an ultraviolet absorber, a levelling agent, a defoamer, a deaerater, a wetting agent, a film-forming assisting agent, an anti-skinning agent or a curing agent may be incorporated. The coloring agent includes a dye, an organic pigment and an inorganic pigment. The plasticizer may be of a conventional type, for example, a low molecular weight plasticizer such as dimethyl phthalate or dioctyl phthalate, or a high molecular weight plasticizer such as a vinyl polymer plasticizer or a polyester plasticizer. The curing agent includes, for example, a block isocyanate such as a trimer of hexamethyleneisocyanate, a melamine resin such as methylated melamine, methylol-modified melamine or butylol-modified melamine, and a urea resin such as methylated urea or butylated urea.

When the aqueous dispersion of the present invention is to be used as a base for an aqueous coating composition, it may be used by itself. However, in some cases, it is advantageous to blend other aqueous dispersion such as an acrylate, since various properties of the coating layer may be improved.

Now, the present invention will be described in further detail with reference to Examples. However, it should be understood that the present invention is by no means restricted by such specific Examples. In the following Examples, "parts" means "parts by weight" unless otherwise specified.

Preparation Examples for preparation of aqueous dispersions of fluorine-containing copolymers Preparation Example 1 into a stainless steel autoclave (pressure resistance: 50 kg/cm$^2$) equipped with a stirrer and having an internal capacity of 200 ml, 35 parts of chlorotrifluoroethylene, 11 parts of cyclohexyl vinyl ether, 43 parts of ethyl vinyl ether, 15 parts of $\omega$-hydroxybutyl vinyl ether, 98 parts of xylene, 28 parts of ethanol, 0.5 part of azobisisobutylonitrile and 1.5 parts of anhydrous potassium carbonate were charged, and the mixture was cooled with liquid nitrogen and dissolved air was removed by solidification deaeration. Then, the reaction was conducted at 65° C. for 16 hours to obtain a fluorine-containing copolymer having hydroxyl groups.

The copolymer thus obtained had an intrinsic viscosity of 0.11 dl l/g as measured at 30° C. in tetrahydrofuran.

A xylene solution containing about 60% of the fluorine-containing copolymer containing hydroxyl groups (hydroxyl value: about 120 mg KOH/g-resin) was heated to 50° C., and 3.6 parts of succinic anhydride and 10 parts of acetone were added, per 100 parts of the polymer. Further, 0.2 part of triethylamine was added, and the reaction was conducted for 10 hours.

The infrared spectrum of the reaction solution was measured, whereby the absorption (1,850 cm$^{-1}$, 1,780 cm$^{-1}$) characteristic to the anhydride observed before the reaction, disappeared after the reaction, and the absorption by a carboxylic acid (1,710 cm$^{-1}$) and by an ester (1,735 cm$^{-1}$) was observed.

Thus, the fluorine-containing copolymer having carboxyl groups introduced thereto, had an acid value of 20 mg KOH/g-resin, and a hydroxyl value of 100 mg KOH/g-resin.

The fluorine-containing copolymer thus obtained was subjected to evaporation of the solvent to isolate the solid content of the copolymer, and then it was dissolved afresh in ethyl alcohol to obtain an ethyl alcohol solution having a concentration of about 60%.

135 parts of this ethyl alcohol solution was introduced into a reactor equipped with a stirrer and a reflux condenser, and 4 parts of triethanol amine was added. Then, 150 parts of deionized water was added thereto to obtain an aqueous solution of the fluorine-containing copolymer.

Preparation Examples 2 TO 6

In the same manner as in Preparation Example 1, the monomer identified in Table 1 was polymerized to obtain a xylene solution of a fluorine-containing copolymer containing hydroxyl groups.

Then, by using the copolymer solution obtained, succinic anhydride in an amount identified in Table 1 was reacted in the same manner as in Preparation Example 1 to obtain a fluorine-containing copolymer containing both carboxyl groups and hydroxyl groups.

The acid value and the hydroxyl value of each fluorine-containing copolymer were as shown in Table 1.

Each fluorine-containing copolymer was formed into an aqueous solution in the same manner as in Preparation Example 1.

TABLE 1

| Preparation Example No. | 1 | 2 | 3 | 4 | 5 | 6 |
|---|---|---|---|---|---|---|
| CTFE | 35 | 35 | 35 | 35 | 35 | 35 |
| CHVE | 11 | 11 | 11 | 11 | 11 | 11 |
| EVE | 4.3 | 8.3 | 4.3 | 14 | 11 | 4.3 |
| HBVE | 15 | 7.0 | 7.0 | 11 | 11 | 15 |
| Xylene | 98 | 98 | 98 | 98 | 98 | 98 |
| Ethanol | 28 | 28 | 28 | 28 | 28 | 28 |
| AIBN | 0.5 | 0.5 | 0.5 | 0.5 | 0.5 | 0.5 |
| K$_2$CO$_3$ | 1.5 | 1.5 | 1.5 | 1.5 | 1.5 | 1.5 |
| Succinic anhydride (per 100 of resin) | 3.6 | 1.3 | 2.9 | 2.9 | 4.5 | 1.8 |
| Hydroxyl value (mg/KOH g-resin) | 100 | 45 | 36 | 64 | 55 | 110 |
| Acid value (mg/KOH g-resin) | 20 | 7 | 16 | 16 | 25 | 10 |

CTFE: chlorotrifluoroethylene
CHVE: cyclohexyl vinyl ether
EVE: ethyl vinyl ether
HBVE: $\omega$-hydroxybutyl vinyl ether
AIBN: azobisisobutyronitrile Preparation Example 7 into a stainless steel autoclave equipped with a stirrer and having an internal capacity of 200 ml, the following materials were charged:

| | |
|---|---|
| Chlorotrifluoroethylene | 35 parts |
| Cyclohexyl vinyl ether | 11 parts |
| Ethyl vinyl ether | 4.3 parts |
| $\omega$-Hydroxybutyl vinyl ether | 7.5 parts |
| CF$_2$=CFOCF$_2$CFOCF$_2$CF$_2$SO$_3$F $\quad$ $\vert$ $\quad$ CF$_3$ | 78.8 parts |
| Xylene | 98 parts |
| Ethanol | 28 parts |
| Azobisisobutyronitrile | 0.5 part |
| Anhydrous potassium carbonate | 1.3 parts |

The mixture was cooled with liquid nitrogen, and dissolved air was removed by solidification deaeration. The reaction was conducted at 65° C. for 16 hours to obtain a fluorine-containing copolymer containing sulfonyl groups.

The copolymer thus obtained was precipitated in methanol and dried. 40 g of this dried polymer was immersed in a 10% KOH aqueous solution at 90° C. for 15 hours for hydrolysis, and then ion-exchanged to sulfonic acid form with a 1N HCl aqueous solution. The fluorine-containing copolymer containing sulfonic acid groups thus obtained, was once dried, and then dissolved in ethyl alcohol to obtain an ethyl alcohol solution having a concentration of about 60%.

50 parts of this ethyl alcohol solution was introduced into a reactor equipped with stirrer, a thermometer and a reflux condenser, and 2.32 parts of triethanol amine was added thereto. Then, 76 parts of deionized water was added thereto to obtain an aqueous solution of the fluorine-containing copolymer.

Preparation Example 8

| | |
|---|---|
| 2-Perfluorobutylethyl methacrylate | 50 parts |
| 2-Hydroxyethyl methacrylate | 55 parts |
| Acrylic acid | 5 parts |

Fifty parts of a dispersion obtained by copolymerizing the above monomers was neutralized with triethanolamine, and dissolved in 50 parts of ethanol. Then, 100 parts of deionized water was added thereto to obtain an aqueous dispersion.

EXAMPLE 1

Into a stainless steel autoclave (pressure resistance: 50 kg/cm$^2$) equipped with a stirrer and having an internal capacity of 200 ml, the following materials were charged:

| | |
|---|---|
| Chlorotrifluoroethylene | 41.5 parts |
| Cyclohexyl vinyl ether | 13.5 parts |
| Ethyl vinyl ether | 15.4 parts |
| ω-Hydroxybutyl vinyl ether | 3.6 parts |
| The fluorine-containing copolymer aqueous solution prepared in Preparation Example 1 | 29.0 parts |
| Deionized water | 98.2 parts |
| Ammonium persulfate | 0.16 part |
| Sodium hydrogen sulfite | 0.023 part |
| Potassium carbonate | 0.4 part |

The mixture was cooled with liquid nitrogen, and dissolved air was removed by solidification deaeration. Then, the reaction was conducted at 30° C. for 12 hours. The aqueous polymer dispersion thus obtained was stable.

EXAMPLES 2 AND 3

Polymerization was conducted in the same manner as in Example 1 except that the fluorine-containing copolymer aqueous solution having the composition as identified in Preparation Example 2 or 3 in Table 1, was used. In each case, a stable aqueous polymer dispersion was obtained as in Example 1.

EXAMPLE 4

| | |
|---|---|
| The fluorine-containing copolymer aqueous solution having the composition as identified in Preparation Example 4 in Table 1 | 80 parts |
| n-Butyl methacrylate | 70 parts |
| Ammonium persulfate | 0.56 parts |
| 2-Hydroxyethyl methacrylate | 10 parts |
| Deionized water | 94.5 parts |

The above materials were charged in an autoclave equipped with a stirrer and having an internal capacity of 300 ml and cooled with liquid nitrogen, and dissolved oxygen was removed by solidification deaeration.

Then, the polymerization was conducted at 60° C. for two hours. The aqueous dispersion thereby obtained was stable.

EXAMPLE 5

Polymerization was conducted at 60° C. for two hours in the same manner as in Example 4 except that the fluorine-containing copolymer aqueous solution having the composition as identified in Preparation Example 5 in Table 1, was used. The aqueous dispersion thus obtained was stable.

EXAMPLE 6

| | |
|---|---|
| The fluorine-containing copolymer aqueous solution having the composition as identified in Preparation Example 6 in Table 1 | 30 parts |
| Veova 10 (vinyl ester, manufactured by Shell Chemical Company) | 45 parts |
| ω-Hydroxybutyl vinyl ether | 6.8 parts |
| Chlorotrifluoroethylene | 33.6 parts |
| Deionized water | 90 parts |
| Ammonium persulfate | 0.16 part |

The above materails were charged into a stainless steel autoclave equipped with a stirrer and having an internal capacity of 300 ml and cooled with liquid nitrogen, and dissolved oxygen was removed by solidification deaeration. Then, polymerization was conducted at 65° C. for 16 hours. The aqueous polymer dispersion thus obtained was stable.

EXAMPLE 7

Emulsion polymerization was conducted in the same manner as in Example 1 except that the fluorine-containing copolymer aqueous solution obtained in Preparation Example 7, was used. The aqueous dispersion thereby obtained was stable.

Comparative Example 1

Emulsion polymerization was conducted in the same manner as in Example 4 except that the fluorine-containing copolymer aqueous solution obtained in Preparation Example 8, was used. The aqueous disperstion thereby obtained was stable.

Example 8 and Comparative Example 2

By using the aqueous dispersions obtained in Examples 1 to 7 and Comparative Example 1, aqueous coating compositions having compositions as identified in Table 2 were prepared. Each of such aqueous coating compositions was coated on an alogin-treated aluminum plate so that the average dried layer thickness would be 25 μm, followed by drying at 170° C. for 30 minutes and baked. The weather resistance of the coating layer thus obtained was evaluated, and the results are shown in Table 2. Each of the coated products thus obtained had excellent bending processability.

TABLE 2

| Aqueous dispersion | Example No. | | | | | | | Comparative Example No. |
|---|---|---|---|---|---|---|---|---|
| | 1 | 2 | 3 | 4 | 5 | 6 | 7 | 1 |
| Aqueous dispersion (parts) | 100 | 100 | 100 | 100 | 100 | 100 | 100 | 100 |
| Curing agent *1 (parts) | 5 | 4 | 4 | 4 | 4 | 5 | 5 | 5 |
| Weather resistance | ○ | ○ | ○ | ○ ʃ | ○ ʃ | ○ | ○ | x |

TABLE 2-continued

| Aqueous dis- | Example No. | | | | | | | Comparative Example No. |
|---|---|---|---|---|---|---|---|---|
| persion | 1 | 2 | 3 | 4 | 5 | 6 | 7 | 1 |
| *2 | | | | | Δ | Δ | | |

*1: As the curing agent, Simel 303 (water-soluble melamine curing agent, manufactured by Chiba-guigy) was used. (The curing agent contains 0.5 part of p-toluene sulfonate as a curing catalyst.)
*2: The weather resistance was evaluated after 3,000 hours by sun shine weatherometer by the following standards:
○: No loss of gloss
Δ: slight loss of gloss
x: whitening or formation of haze

EXAMPLE 9

Each of the aqueous dispersions obtained in Examples 1 to 7 was coated on a slate plate and dried at 120° C. for one hour to obtain a test piece. Each test piece was subjected to a heating-cooling repetition test and a water permeation test in accordance with JIS A-6910, whereby in each case good results were obtained.

EXAMPLE 10

An aqueous coating composition obtained by mixing 70 parts of the aqueous dispersion obtained in Example 1 and 30 parts of the aqueous dispersion obtained in Example 4, was coated on a glass plate and dried. The coating layer thus obtained exhibited antistatic properties improved over the coating layer formed by coating the aqueous dispersion obtained in Example 1 alone, followed by drying.

EXAMPLE 11

Into a stainless steel autoclave (pressure resistance: 50 kg/cm$^2$) equipped with a stirrer and having an internal capacity of 200 ml, 22.1 parts of ethyl vinyl ether, 1.5 parts of hydroxybutyl vinyl ether, 4.5 parts of a macromonomer A having a hydrophilic site, 99.1 parts of deionized water, 0.35 part of an ammonium salt of perfluorooctanic acid, 0.35 part of potassium carbonate, 0.02 part of sodium hydrogen sulfite and 0.11 part of ammonium persulfate, were charged and cooled with ice. Then, nitrogen gas was introduced under a pressure of 3.5 kg/m$^2$ for deaeration. This operation was repeated twice and then dissolved air was removed by evacuation to a pressure of 10 mm Hg. Then 38.0 parts of chlorotrifluoroethylene was charged, and the reaction was conducted at 30° C. for 12 hours. The charactertistic values of the aqueous dispersion I thus obtained are shown in Table 3, and the physical properties of the coating layer are shown in Table 4.

EXAMPLE 12

Into the same autoclave as used in Example 11, 19.5 parts of cyclohexyl vinyl ether, 6.7 parts of ethyl vinyl ether, 5.7 parts of hydroxybutyl vinyl ether, 13.6 parts of a macromonomer B having a hydrophilic site, 114.6 parts of deionized water, 0.44 part of ammonium salt of perfluorooctanic acid, 0.44 part of potassium carbonate, 0.02 part of sodium hydrogen sulfite and 0.14 part of ammonium persulfate were charged, and treated in the same manner as in Example 11. Then, 30.9 parts of tetrafluoroethylene was charged, and the reaction was conducted at 30° C. for 12 hours. The properties of the aqueous dispersion II thus obtained are shown in Table 3, and the physical properties of the coating layer are shown in Table 4.

EXAMPLE 13

Into the same autoclave as used in Example 11, 21.7 parts of cyclohexyl vinyl ether, 7.9 parts of ethyl vinyl ether, 6.4 parts of hydroxybutyl vinyl ether, 6.9 parts of a macromonomer C having a hydrophilic site, 124.7 parts of deionized water 0.44part of ammonium salt of perfluorooctanic acid, 0.44 part of potassium carbonate and 0.14 part of ammonium persulfate were charged and treated in the same manner as in Example 11. Then, 40.0 parts of chlorotrifluoroethylene was charged, and the reaction was conducted at 30° C. for 12 hours. The properties of the aqueous dispersion III thus obtained are shown in Table 3, and the physical properties of the coating layer are shown in Table 4.

EXAMPLE 14

Into the same autoclave as used in Example 11, 22.1 parts of ethyl vinyl ether, 1.5 parts of hydroxybutyl vinyl ether, 4.5 parts of a macromonomer A having a hydrophilic site, 99.1 parts of deionized water, 0.35 part of potassium carbonate, 0.02 part of sodium hydrogen sulfite and 0.11 part of ammonium persulfate were charged and treated in the same manner as in Example 11. Then, 38.7 parts of chlorotrifluoroethylene was charged, and the reaction was conducted at 30° C. for 12 hours. The properties of the aqueous dispersion IV thus obtained are shown in Table 3, and the physical properties of the coating layer are shown in Table 4.

Comparative Example 3

Into the same autoclave as used in Example 11, 22.5 parts of ethyl vinyl ether, 1.5 parts of hydroxybutyl vinyl ether, 80.0 parts of deionized water, 9.7 parts of ethanol, 0.34 part of ammonium salt of perfluorooctanic acid, 0.23 part of potassium carbonate, 0.01 part of sodium hydrogen sulfite and 0.11 part of ammonium persulfate and treated in the same manner as in Example 11. Then, 49.9 parts of chlorotrifluoroethylene was charged, and the reaction was conducted at 30° C. for 12 hours. The physical properties of the aqueous dispersion thus obtained are shown in Table 3, and the physical properties of the coating layer are shown in Table 4.

Comparative Example 4

Into the same autoclave as used in Example 11, 29.6 parts of ethyl vinyl ether, 2.0 parts of hydroxybutyl vinyl ether, 122.3 parts of deionized water, 0.44 part of ammonium salt of perfluorooctanic acid, 3.02 parts of a non-ionic emulsifier ("Newcol 110", manufactured by Nippon Nyukazai K.K.), 0.44 part of potassium carbonate, 0.02 part of sodium hydrogen sulfite and 0.15 part of ammonium persulfate were charged and treated in the same manner as in Example 11. Then, 49.9 parts of chlorotrifluoroethylene was charged, and the reaction was conducted at 30° C. for 15 hours. The properties of the aqueous dispersion thus obtained are shown in Table 3, and the physical properties of the coating layer are shown in Table 4.

TABLE 3

| | Example No. | | | | Comparative Example No. | |
|---|---|---|---|---|---|---|
| | 11 | 12 | 13 | 14 | 3 | 4 |
| Composition of copolymer (mol %) | | | | | | |
| TFE | | 50 | | | | |

TABLE 3-continued

|  | Example No. 11 | Example No. 12 | Example No. 13 | Example No. 14 | Comparative Example No. 3 | Comparative Example No. 4 |
|---|---|---|---|---|---|---|
| CTFE | 50 |  | 50 | 50 | 50 | 50 |
| CHVE |  | 25 | 25 |  |  |  |
| EVE | 47 | 16 | 15 | 47 | 47 | 47 |
| HBVE | 2 | 8 | 8 | 2 | 2 | 2 |
| Macromonomer |  |  |  |  |  |  |
| A | 1 |  |  | 1 |  |  |
| B |  | 1 |  |  |  |  |
| C |  |  | 2 |  |  |  |
| Emulsion yield (%) | 98.0 | 97.3 | 96.0 | 95.5 | 97.4 | 94.7 |
| Residue upon heating (%) | 39.0 | 40.1 | 39.4 | 38.9 | 41.0 | 40.0 |
| Polymer particle size (μm) | 0.11 | 0.11 | 0.12 | 0.12 | 0.15 | 0.13 |
| Mechanical stability 1) | 0 ppm | 0 ppm | 0 ppm | 0 ppm | Entirely coagulated | Entirely coagulated |
| Chemical stability 2) |  |  |  |  |  |  |
| CaCl2 sol. 10% | 100 ppm | 800 ppm | 300 ppm | 800 ppm | Entirely coagulated | 1,500 ppm |
| CaCl2 sol. 1% | 0 ppm | 0 ppm | 0 ppm | 0 ppm | Entirely coagulated | 100 ppm |

1) By using "Biomixer" manufactured by Kabushiki Kaisha Nippon Seiki Seisakusho, stirring was conducted 5,000 rpm for 5 minutes, then the dispersion was filtered through a stainless steel net (120 mesh) and dried, and then the filtration residue was weighed, and the coagulation rate was calculated.

2) To a sample of the aqueous dispersion, the same amount of a 10% or 1% aqueous solution of calcium chloride (CaCl$_2$), and the mixture was stirred for one hours. Then, the mixture was diluted three times with deionized water and then filtered through a nylon fiter paper (200 mesh). After drying, the filtration residue was weighed, and the coagulation rate was calculated.

TABLE 4

|  |  | Example No. 11 | Example No. 12 | Example No. 13 | Example No. 14 | Comparative Example No. 3 | Comparative Example No. 4 |
|---|---|---|---|---|---|---|---|
| Film forming properties |  | Good | Good | Good | Good | Not smooth Shrinkage observed | Not smooth Shrinkage observed |
| Water resistance | Boiling water resistance 1) | Good | Good | Good | Good | Whitening | Whitening |
|  | Water absorptivity 2) (%) | 6.2 | 3.9 | 7.4 | 3.9 | 30.6 | 57.9 |

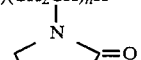

| Macromonomer having a hydrophilic site | Structural formula | Number average molecular weight |
|---|---|---|
| A | $CH_2{=}CHO(CH_2)_4(OCH_2CH_2)_nOH$ | 700 |
| B | $CH_2{=}CHO(CH_2)_4(OCH_2CH_2)_m(OCH_2CH)_nOH$, CH$_3$, m/n ≈ 7/3 | 1,100 |
| C | $CH_2{=}CHOCH_2OCH_2CHCH_2O_2C(CH_3)(CH_2CH)_nH$, OH, CH3, N (pyrrolidinone) =O | 1,000 |

1) On a glass plate, a test sample of the aqueous dispersion was coated and dried under heating at 150° C. for 5 minutes. The dried coating layer was immersed in a boiling water for 4 hours and then evaluated by visual observation.

2) After the test 1) the increase in the weight of the film was calculated.

Preparation Example 9

Into a stainless autoclave having an internal capacity of 200 ml, 35 parts of chlorotrifluoroethylene, 11 parts of cyclohexyl vinyl ether, 5.4 parts of ethyl vinyl ether, 4.3 parts of ω-hydroxybutyl vinyl ether, 65 parts of macromonomer A having a hydrophilic site, 83 parts of xylene, 43 parts of ethanol, 0.5 part of azobisisobutylonitrile and 1.5 parts of anhydrous potassium carbonate were charged and cooled with liquid nitrogen, and dissolved air was removed by solidification deaeration. Then, the reaction was conducted at 65° C. for 15 hours to obtain a solution of a polymer having hydrophilic sites. The solvent was evaporated, and the solid content of the polymer was dissolved afresh in ethyl alcohol, and deionized water was added to obtain an aqueous dispersion having a polymer concentration of 30%.

EXAMPLE 15

Into a stainless steel autoclave (pressure resistance: 50 kg/cm$^2$) equipped with a stirrer and having an internal capacity of 200 ml, the following materials were charged:

| | |
|---|---|
| Chlorotrifluoroethylene | 38 parts |
| Cyclohexyl vinyl ether | 19.5 parts |
| Ethyl vinyl ether | 6.7 parts |
| ω-Hydroxybutyl vinyl ether | 5.7 parts |
| Aqueous dispersion obtained in Preparation Example 9 | 33 parts |
| Deionized water | 114.6 parts |
| Ammonium persulfate | 0.14 part |
| Potassium carbonate | 0.44 part |

The mixture was cooled with liquid nitrogen, and dissolved air was removed by solidification deaeration. Then, the reaction was conducted at 30° C. for 12 hours. The aqueous dispersion thereby obtained was stable. An aqueous coating composition obtained by adding 5 parts of a curing agent (block isocyanate emulsion, Prominate XC-910, tradename, manufactured by Takeda Chemical Industries Company Limited) to 100 parts of this aqueous dispersion, was coated on an alogin-treated aluminum plate so that a dried average layer thickness would be 25 μm, then dried at 170° C. for 30 minutes and baked to obtain a test piece. This test piece was subjected to a sun shine weatherometer for 3,000 hours, whereby no loss of gloss was observed.

EXAMPLE 16

Seven parts of an aqueous dispersion of an ultraviolet absorber obtained by dispersing 35 parts of a benzophenone-type ultraviolet absorber (2-hydroxy-4-n-octoxybenzophenone) in 100 parts of deionized water by means of a surfactant (Surflon S 111P, manufactured by Asahi Glass Company Ltd.), 100 parts of the aqueous dispersion obtained in Example 12 and 6 parts of a curing agent (block isocyanate emulsion, Prominate XC-910, tradename, manufactured by Takeda Chemical Industries Company Limited) were mixed to obtain an aqueous coating composition. To this aqueous coating composition, a wood piece (Japanese cypress) was dipped and then dried at 170° C. for 30 minutes to obtain a test piece. This test piece was subjected to a due cycle meter for 500 hours, whereby no color change, no peeling of the coating layer, no loss of gloss or no whitening was observed.

As a comparative test, a non-coated wood piece was tested in the same manner, whereby it underwent color change to brown.

According to the present invention, it is possible to readily and safely produce and aqueous dispersion which is capable of providing a film having excellent weather resistance. An aqueous coating composition obtained by the present invention is very useful as a weather resistant and water resistant coating material and is useful for application to a coating material for ceramics and construction materials, a coating material for slate-type roof material, a coating material for electrical equipments and a coating material for domestic use. Further, an aqueous dispersion prepared by the process of the present invention, is available as a dispersion having a high molecular weight and a high concentration as compared with an aqueous dispersion obtainable by e.g. solution polymerization. Accordingly, the aqueous dispersion obtained by the present invention is useful as a coating material in the field where a flexibility of the coating layer is required, such as in a precoat metal field, and is useful also as a highly durable water and oil repellant for fibers and fabrics.

Further, an aqueous dispersion comprising a fluorine-containing copolymer dispersed in water wherein the fluorine-containing copolymer is a fluoropoymer comprising polymer units of a macromonomer having a hydrophilic site, as excellent storage stability and is very useful as a base for an aqueous coating composition which is capable of presenting a coating layer having excellent weather resistance.

What is claimed is:

1. A process for preparing an aqueous dispersion, which comprises:
    subjecting a monomer to emulsion polymerization in an aqueous medium in the presence of a fluorine-containing copolymer consisting of 20 to 80 mol % units derived from a fluoroolefin monomer selected from the group consisting of vinylidene fluoride, trifluoroethylene, chlorotrifluoroethylene, tetrafluoroethylene, pentafluoropropylene and hexafluoropropylene, 0.1 to 80 mol % units derived from at least one unsaturated monomer containing hydrophilic groups, reactive groups which can be converted to hydrophilic groups or a combination of hydrophilic groups and reactive groups which can be converted to hydrophilic groups, and up to 70 mol % of a monomer selected from the group consisting of an olefin, a vinyl ether, a vinyl ester, an allyl ether, an allyl ester, an acrylic acid ester or methacrylic acid ester.

2. The process according to claim 1, wherein the fluorine-containing copolymer is a water-soluble or water-dispersible polymer.

3. The process according to claim 1, wherein the hydrophilic side chain is a chain selected from the group consisting of a polyoxyalkylene chain, a chain having a carboxylic acid group or a carboxylate group at its terminal, a chain having a phosphonic acid group or a phosphonate group at its terminal and a chain having a sulfonic group or a sulfonate group at its terminal.

4. The process according to claim 1, wherein the hydrophilic side chain is a polyoxyethylene chain.

5. The process according to claim 1, wherein the fluorine-containing copolymer has curable reactive sites.

6. The process according to claim 5, wherein the curable reactive sites are hydroxyl groups.

7. The process according to claim 1, wherein the monomer is a monomer having an α,β-ethylenically unsaturated group.

8. The process according to claim 7, wherein the monomer is a mixture comprising a fluoroolefin having from 2 to 4 carbon atoms and at least one memeber selected from the group consisting of a vinyl compound, an allyl compound, a fluorinated vinyl compound and a fluorinated allyl compound.

9. The process according to claim 1, wherein the monomer having a converter group is a hydroxyalkyl vinyl ether.

10. An aqueous coating composition consisting essentially of an aqueous dispersion obtained by subjecting a monomer to emulsion polymerization in an aqueous medium in the presence of a fluorine-containing copolymer consisting of 20 to 80 mol % units derived from a fluoroolefin selected from the group consisting of vinylidene fluoride, trifluoroethylene, chlorotrifluoroethylene, tetrafluoroethylene, pentafluoropropylene and hexafluoropropylene, 0.1 to 80 mol % units derived from at least one unsaturated monomer containing hydrophilic groups, reactive groups which can be converted to hydrophilic groups or a combination of hydrophilic groups and reactive groups which can be converted to hydrophilic groups, and up to 70 mol % of a monomer selected from the group consisting of an olefin, a vinyl ether, a vinyl ester, an allyl ether, an allyl ester, an acrylic acid ester or methacrylic acid ester.

11. The aqueous coating composition according to claim 10, wherein the fluorine-containing copolymer is a water-soluble or water-dispersible polymer.

12. The aqueous coating composition according, to claim 10, wherein the hydrophilic side chain is a chain selected from the group consisting of a polyoxyalkylene chain, a chain having a carboxylic acid group or a carboxylate group at its terminal, a chain having a phosphonic acid group or a phosphonate group at its terminal and a chain having a sulfonic acid group or sulfonate group at its terminal.

13. The aqueous coating composition according to claim 10, wherein the hydrophilic side chain is a polyoxyethylene chain.

14. The aqueous coating composition according to claim 10, wherein the fluorine-containing copolymer has reactive sites which can be cured.

15. The aqueous coating composition according to claim 14, wherein the curable reactive sites are hydroxyl groups.

16. The aqueous coating composition according to claim 10, wherein the monomer is a monomer having an $\alpha,\beta$-ethylenically unsaturated group.

17. The aqueous coating composition according to claim 10, wherein said units having a hydrophilic side chain are derived from at least one monomer selected from the group consisting of a vinyl ether, a vinyl ester, an allyl ether and an allyl ester.

18. The aqueous coating composition according to claim 10, wherein the monomer contains a monomer having a curable reactive site.

19. The aqueous coating composition according to claim 18, wherein the monomer having a curable reactive site is a hydroxyalkyl vinyl ether.

20. The aqueous coating composition according to claim 10, which further contains a curing agent.

21. The aqueous coating composition according to claim 10, which further contains a hydrophilic organic solvent.

22. The aqueous coating composition according to claim 21, wherein the hydrophilic organic solvent is a lower alcohol.

23. An aqueous coating composition consisting essentially of a mixture of at least two aqueous dispersions, wherein at least one of the aqueous dispersions is the aqueous coating composition as defined in claim 10.

24. The aqueous coating composition according to claim 23, wherein at least one of the aqueous dispersions is an aqueous dispersion of a ultraviolet absorber.

25. A process for preparing an aqueous dispersion, which comprises:
subjecting a monomer to emulsion polymerization in an aqueous dispersion comprising a fluorine-containing copolymer dispersed in water, wherein the fluorine-containing copolymer is a fluoropolymer consisting of 20 to 80 mol % units derived from a fluoroolefin selected from the group consisting of vinylidene fluoride, trifluoroethylene, chlorotrifluoroethylene, tetrafluoroethylene, pentafluoropropylene and hexafluoropropylene, 0.1 to 80 mol % units derived from at least one unsaturated monomer containing hydrophilic groups, reactive groups which can be converted to hydrophilic groups or a combination of hydrophilic groups and reactive groups which can be converted to hydrophilic groups, and up to 70 mol % of a monomer selected from the group consisting of an olefin, a vinyl ether, a vinyl ester, an allyl ether, an allyl ester, an acrylic acid ester or methacrylic acid ester.

26. An aqueous coating composition consisting essentially of an aqueous dispersion comprising a fluorine-containing copolymer dispersed in water, wherein the fluorine-containing copolymer is a fluoropolymer consisting of 20 to 80 mol % units derived from a fluoroolefin monomer selected from the group consisting of vinylidene fluoride, trifluoroethylene, chlorotrifluoroethylene, tetrafluoroethylene, pentafluoropropylene and hexafluoropropylene and 0.1 to 80 mol % units derived from at least one unsaturated monomer containing hydrophilic groups, reactive groups which can be converted to hydrophilic groups or a combination of hydrophilic groups and reactive groups which can be converted to hydrophilic groups, and up to 70 mol % of a monomer selected from the group consisting of an olefin, a vinyl ether, a vinyl ester, an allyl ether, an allyl ester, an acrylic acid ester or methacrylic acid ester.

27. The aqueous coating composition according to claim 26, which contains a curing agent.

28. The aqueous coating composition according to claim 26, which contains an ultraviolet absorber.

29. The process according to claim 1, wherein the amount of said fluoro-containing copolymer in the emulsion ranges from 0.1 to 99 parts by weight per 100 parts by weight of the monomer to be emulsion polymerized.

30. The process according to claim 1, wherein said monomer having a hydrophilic group is a member selected from the group consisting of

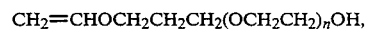

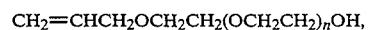

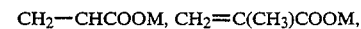

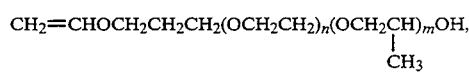

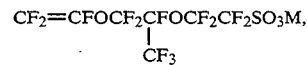

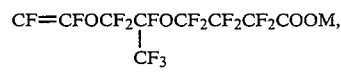

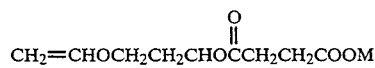

wherein M is hydrogen, an alkali metal, a quaternary ammonium group or a quaternary phosphonium group.

* * * * *

UNITED STATES PATENT AND TRADEMARK OFFICE
CERTIFICATE OF CORRECTION

PATENT NO. : 5,447,982
DATED : September 5, 1995
INVENTOR(S) : Motoi KAMBA, et al.

It is certified that error appears in the above-indentified patent and that said Letters Patent is hereby corrected as shown below:

On the title page, Item [30], the second Foreign Application Priority Number should read:

--63-239653--

Signed and Sealed this

Twenty-sixth Day of December, 1995

Attest:

BRUCE LEHMAN

Attesting Officer     Commissioner of Patents and Trademarks